(12) United States Patent
Jungert et al.

(10) Patent No.: US 8,260,506 B2
(45) Date of Patent: Sep. 4, 2012

(54) METHOD FOR ADJUSTING A PASSENGER SEAT IN A MOTOR VEHICLE

(75) Inventors: Dieter Jungert, Weissach (DE); Tassilo Gilbert, Pforzheim (DE)

(73) Assignee: Dr. Ing. h.c.F. Porsche, Aktiengesellschaft (DE)

( * ) Notice: Subject to any disclaimer, the term of this patent is extended or adjusted under 35 U.S.C. 154(b) by 449 days.

(21) Appl. No.: 12/574,284

(22) Filed: Oct. 6, 2009

(65) Prior Publication Data

US 2010/0152977 A1  Jun. 17, 2010

(30) Foreign Application Priority Data

Dec. 13, 2008 (DE) .......................... 10 2008 062 189

(51) Int. Cl.
  *B60R 22/00* (2006.01)
(52) U.S. Cl. ........................................................ 701/49
(58) Field of Classification Search ........................ 701/49
  See application file for complete search history.

(56) References Cited

U.S. PATENT DOCUMENTS

| | | | |
|---|---|---|---|
| 4,852,934 A | | 8/1989 | Yasuda et al. |
| 4,935,680 A | * | 6/1990 | Sugiyama ..................... 318/567 |
| 6,775,606 B1 | | 8/2004 | Ertl et al. |
| 2007/0032912 A1 | | 2/2007 | Jung et al. |

FOREIGN PATENT DOCUMENTS

| | | |
|---|---|---|
| CN | 2519749 | 11/2002 |
| DE | 35 10 391 | 10/1986 |
| DE | 3510391 | 10/1986 |
| DE | 38 43 624 | 7/1989 |
| DE | 197 31 053 | 1/1999 |
| DE | 19731053 | 1/1999 |
| DE | 101 11 610 | 10/2002 |
| DE | 10111610 | 10/2002 |
| DE | 101 51 926 | 5/2003 |
| DE | 10151926 | 5/2003 |
| DE | 103 12 119 | 10/2003 |
| DE | 10312119 | 10/2003 |
| DE | 103 37 852 | 3/2005 |
| DE | 10 2008 012 977 | 9/2008 |
| DE | 102008012977 | 9/2008 |
| GB | 2172500 | 9/1986 |

* cited by examiner

*Primary Examiner* — Thomas Tarcza
*Assistant Examiner* — Maceeh Anwari
(74) *Attorney, Agent, or Firm* — Gerald E. Hespos; Michael J. Porco

(57) ABSTRACT

The invention relates to a method for adjusting a passenger seat (2) in a motor vehicle, in particular in an open two-seater. The method includes verifying whether the passenger seat (2) is occupied and adjusting the passenger seat, according to one or more settings of the driver seat (1) selected by the driver of the motor vehicle if a verification result determines that the passenger seat is not occupied.

7 Claims, 1 Drawing Sheet

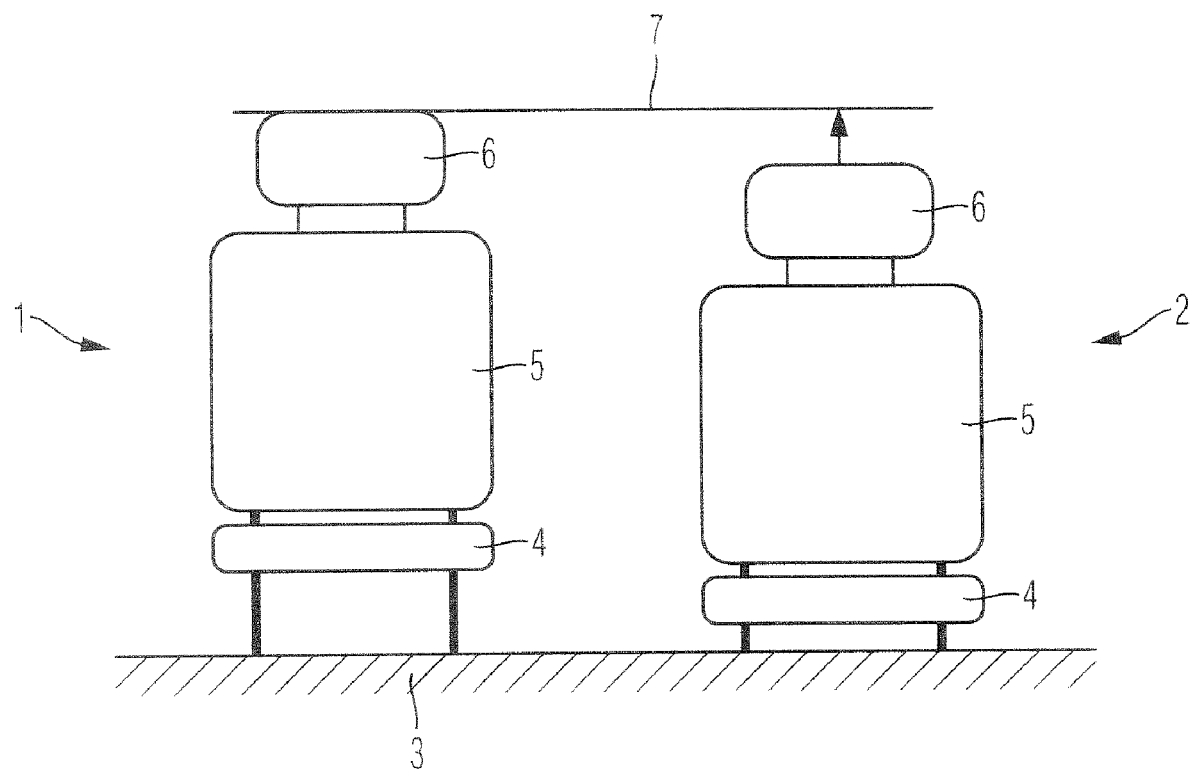

METHOD FOR ADJUSTING A PASSENGER SEAT IN A MOTOR VEHICLE

CROSS-REFERENCE TO RELATED APPLICATIONS

This application claims priority under 35 USC 119 to German Patent Application No. 10 2008 062 189.7 filed on Dec. 13, 2008, the entire disclosure of which is incorporated herein by reference.

BACKGROUND OF THE INVENTION

1. Field of the Invention

The invention relates to a method for adjusting a passenger seat in a motor vehicle, in particular in an open two-seater.

2. Description of the Related Art

DE 101 51 926 A1 discloses a method for operating a motor vehicle in which the head restraint of at least one seat of the motor vehicle is adjusted relative to the vehicle occupant depending on the occupancy situation of the seat. In this connection, the occupancy situation of the seat is detected optically by an optical image acquisition system. A decision then is made about the automatic adjustment of the head restraint relative to the vehicle occupant depending on the evaluated occupancy situation of the seat.

U.S. Pat. No. 6,775,606 B1 discloses a method for identifying the occupancy of a seat. The seat is provided with optical markings. The size of a person located on the seat may be determined by using a camera and the markings. Thus, safety systems may be controlled accurately relative to the person occupying the seat.

DE 35 10 391 A1 discloses a system that enables a rear passenger seated behind a front seat can adjust the front seat when the front seat is empty.

U.S. Pat. No. 4,852,934 discloses a system that limits the possibility of adjustment to a front seat when a rear passenger is seated behind the front seat.

DE 38 43 624 A1 discloses a system that raises the head restraint of a rear seat when the rear seat is occupied. Only when the rear seat is unoccupied is it possible for the driver to fold down the head restraint.

It is the object of the present invention to provide a method for adjusting a passenger seat in a motor vehicle, in particular in an open two-seater, so that the appearance of the vehicle can be influenced positively.

SUMMARY OF THE INVENTION

The invention relates to a method for adjusting a passenger seat in a motor vehicle, in particular in an open two-seater. The method comprises verifying whether the passenger seat is occupied by a person and then adjusting the passenger seat, according to one or more settings selected by the driver of the vehicle, in the event of a verification result that the passenger seat is not occupied.

Thus a visually attractive appearance of the motor vehicle seat may be achieved, in particular in open two-seaters, due to substantially the same appearance of the driver seat and passenger seat. Adjustments of the driver seat also are undertaken in the passenger seat to achieve the same appearance of the driver seat and passenger seat.

The extent to which adjustments to the passenger seat are undertaken from the driver seat when the passenger seat is not occupied by a person depends on the relative importance of the viewing directions from which the driver seat and passenger seat are perceived by third parties. Thus, observing the motor vehicle, in particular the open two-seater, from the front or from the rear is particularly important. The motor vehicle driven according to the invention, therefore, is visible for several seconds to occupants of an on-coming vehicle or a vehicle to the rear. Observed from this viewing direction, the seat height, the seat inclination, the backrest inclination and the head restraint height of the driver seat and passenger seat are of particular importance. In this regard, the invention provides that the settings selected by the driver are a seat height setting, a seat inclination setting, a backrest inclination setting and/or a head restraint height setting, and these settings are reproduced in the passenger seat when the passenger seat is not occupied.

The longitudinal seat position also is of particular importance when judging the overall visual impression of the motor vehicle, in particular of the open two-seater, when the motor vehicle is closely inspected from the side. In this regard, it is further seen as advantageous if the setting selected by the driver is the longitudinal seat position, so that the longitudinal seat position of the driver seat is reproduced in the passenger seat when the passenger seat is not occupied. This may also increase the comfort, for example, by a rearward longitudinal seat position being set after the passenger seat has been occupied by a small person, corresponding to a forward longitudinal seat position.

Vehicle seats, in particular driver seats and passenger seats, are moved by electrical means and it is provided to store a seat position preferred by the driver, i.e. the position of the seat in the longitudinal position and the vertical position, the inclination position of the seat and backrest and the head restraint height, in a memory function. If a different driver drives the vehicle and moves the seat position, by simply activating the memory function the seat may be adjusted to the preset position of the usual driver of the vehicle. In this regard, it is seen as advantageous if the passenger seat, when not occupied, is controlled according to the memory position of the driver seat.

Consequently, it is regarded as particularly advantageous if the passenger seat is adjusted automatically in the event of a verification result that the passenger seat is not occupied.

The verification of whether the passenger seat is occupied takes place preferably by a device incorporated in the passenger seat for detecting the occupation of the passenger seat or by a contactless device detecting the passenger seat, for example a camera or a laser-based and/or infrared-based device.

BRIEF DESCRIPTION OF THE DRAWING

FIG. 1 s a rear elevational view of two vehicle seats in a row in a motor vehicle.

DETAILED DESCRIPTION OF THE PREFERRED EMBODIMENTS

FIG. 1 illustrates the vehicle seat row of an open two-seater from the rear, with a driver seat 1 and a passenger seat 2 mounted to the vehicle floor 3. Both seats 1, 2 are designed identically and have a seat cushion 4 that is mounted to the vehicle floor 3 and that is displaceable in the longitudinal direction of the vehicle. A backrest 5 is mounted to the seat cushion 4 and a head restraint 6 is mounted in the backrest 5. The driver can adjust the driver seat 1 for a specific condition with respect to the longitudinal arrangement of the seat cushion 4, the inclination and height of the seat cushion 4, the inclination of the backrest 5 and height of the head restraint 6. An adjustment of the passenger seat 2 takes place according to the settings selected for the driver seat 1, i.e. the adjustments to the driver seat, if it is established by means of a camera or other sensing means that the passenger seat is not occupied. Relative to the view of FIG. 1, this means that the seat height of the passenger seat 2 is moved up to the reference line 7 of the upper edge of the head restraint 6 of the driver seat 1. The driver may select the position of the driver seat 1 by using various adjusting elements or according to a stored position (memory position).

What is claimed is:

1. A method for adjusting a front passenger seat in a motor vehicle comprising:
    using a detecting means in the motor vehicle for verifying whether the front passenger seat is occupied,
    automatically operating electrical means of the motor vehicle for adjusting settings of at least the longitudinal position of the front passenger seat to conform to corresponding settings of at least the longitudinal position of the driver seat selected by the driver of the motor vehicle, in the event of a verification result that the front passenger seat is not occupied, thereby achieving a visually attractive appearance for the motor vehicle with the settings of the driver seat and the front passenger seat conforming to one another when the front passenger seat is not occupied.

2. The method of claim 1, wherein the settings of the driver seat selected by the driver further comprise at least one of a seat height setting, a seat inclination setting, a backrest inclination setting and a head restraint height setting.

3. The method of claim 2, wherein the verification of whether the front passenger seat is occupied takes place by using a device incorporated in the front passenger seat for detecting the occupation of the passenger seat or by a camera.

4. The method of claim 1, wherein the front passenger seat is adjusted according to a memory function of the driver seat in the event of a verification result that the front passenger seat is not occupied.

5. A method for enhancing visual appearance of a two passenger convertible motor vehicle comprising:
    using a detecting means in the motor vehicle for verifying whether the passenger seat is occupied,
    automatically operating electrical means of the motor vehicle for adjusting at least one of a seat height setting of the passenger seat, a seat inclination setting of the passenger seat, a backrest inclination setting of the passenger seat and a longitudinal seat position of the passenger seat to conform to corresponding settings of the driver seat selected by the driver of the motor vehicle, in the event of a verification result that the passenger seat is not occupied, thereby achieving a visually attractive appearance for the motor vehicle with the settings of the driver seat and the passenger seat conforming to one another when the passenger seat is not occupied.

6. The method of claim 5, wherein the verification of whether the passenger seat is occupied takes place by using a device incorporated in the passenger seat for detecting the occupation of the passenger seat or by a camera.

7. The method of claim 5, wherein the passenger seat is adjusted according to a memory function of the driver seat in the event of a verification result that the passenger seat is not occupied.

* * * * *